United States Patent

Bleys et al.

Patent Number: 5,459,170
Date of Patent: Oct. 17, 1995

[54] POLYURETHANE FOAMS

[75] Inventors: Gerhard Bleys, Heverlee; Viviane G. J. Neyens, Scherpenheuvel, both of Belgium

[73] Assignee: Imperial Chemical Industries PLC, London, United Kingdom

[21] Appl. No.: 223,929

[22] Filed: Apr. 6, 1994

Related U.S. Application Data

[63] Continuation-in-part of Ser. No. 86,267, Jul. 1, 1993, abandoned.

[30] Foreign Application Priority Data

Apr. 13, 1993 [GB] United Kingdom ............ 9307565

[51] Int. Cl.⁶ ..................................... C08J 9/00
[52] U.S. Cl. ................ 521/125; 521/160; 521/174; 521/176; 521/914; 528/67; 528/76; 528/77
[58] Field of Search ................... 521/125, 160, 521/174, 176, 914; 528/67, 76, 77

[56] References Cited

U.S. PATENT DOCUMENTS

| | | |
|---|---|---|
| 4,098,732 | 7/1978 | Yukuta et al. ............ 521/125 |
| 4,266,043 | 5/1981 | Fujii et al. ............ 521/175 |
| 4,365,025 | 12/1982 | Murch et al. ............ 521/159 |
| 4,478,960 | 10/1984 | Buethe et al. ............ 521/160 |
| 5,043,360 | 8/1991 | Pham et al. ............ 521/160 X |
| 5,124,369 | 6/1992 | Vandichel et al. ............ 521/155 |

FOREIGN PATENT DOCUMENTS

| | | |
|---|---|---|
| 0557792 | of 0000 | European Pat. Off. . |
| 0220697 | 5/1987 | European Pat. Off. . |
| 0294161 | 12/1988 | European Pat. Off. . |
| 1236858 | 6/1971 | United Kingdom . |
| 2022113 | 12/1979 | United Kingdom . |
| 91/14726 | 10/1991 | WIPO . |

*Primary Examiner*—Robert E. Sellers
*Assistant Examiner*—Shelley A. Dudson

[57] ABSTRACT

A method for the preparation of flexible polyurethane foams by reacting a polyisocyanate containing at least 85% by weight of 4,4'-diphenylmethane diisocyanate or a liquid variant thereof with a polyol composition comprising at least one poly(oxyethylene-oxyalkylene) polyol, the composition having an average nominal hydroxyl functionality of from 2.5 to 6, a number average hydroxyl equivalent weight of from 1000 to 3000 and an average oxyethylene content of from 25 to less than 50% by weight and with water.

10 Claims, No Drawings

POLYURETHANE FOAMS

CROSS REFERENCE TO RELATED APPLICATION

The present application is a continuation-in-part of patent application Ser. No. 08/086,267, filed Jul. 1, 1993, now abandoned, entitled "Polyurethane Foams".

The manufacture of polyurethane flexible foams by reacting organic polyisocyanates such as tolylene diisocyanate (TDI) or diphenylmethane diisocyanate (MDI) with polyether polyols in conjunction with a foaming agent is well established. The polyethers are usually polyoxypropylene polyols derived from propylene oxice or poly (oxypropylene-oxyethylene) polyols derived from various combinations of propylene and ethylene oxides. Ethylene oxide tipped polyoxypropylene polyols wherein the oxyethylene groups constitute a minor proportion of the total oxyalkylene residues are particularly important because of their enhanced reactivity towards isocyanates.

Polyols having higher oxyethylene contents, for example 50% or more on a weight basis, are often employed as minor additives to ensure that the foams have an open-cell structure.

It has now been found that flexible foams having valuable properties can be made from formulations containing polyol compositions having medium oxyethylene contents if substantially pure 4,4'-MDI or a liquid derivative thereof is employed as the polyisocyanate.

Thus according to the invention, there is provided a method for the preparation of flexible polyurethane foams by reacting a polyisocyanate containing at least 85%, preferably at least 90% and more preferably at least 95% by weight of 4,4'-diphenylmethane diisocyanate or a liquid variant thereof with a polyol composition comprising at least one poly(oxyethylene-oxyalkylene) polyol, the composition having an average nominal hydroxyl functionality of from 2.5 to 6, preferably 2.5 to 3, a number average hydroxyl equivalent weight of from 1000 to 3000 and an average oxyethylene content of from 25 to less than 50, preferably 40 to less than 50% by weight and with water.

The polyisocyanate component used in the method of the invention may consist essentially of pure 4,4'-diphenylmethane diisocyanate or mixtures of this diisocyanate with one or more other organic polyisocyanates, especially other diphenylmethane diisocyanate isomers, for example the 2,4'-isomer optionally in conjunction with the 2,2'-isomer. The polyisocyanate component may also be an MDI variant derived from a polyisocyanate composition containing at least 85% by weight of 4,4'-diphenylmethane diisocyanate. MDi variants are well known in the art and, for use in accordance with the invention, particularly include liquid (at ambient conditions) products obtained by introducing uretonimine and/or carbodiimide groups into said polyisocyanate composition (e.g. comprising up to 30% by weight of uretonimine- and/or carbodiimide modified 4,4'-MDI) and/or by reacting such a composition with one or more polyols.

The polyols in the polyol composition are known in the art and may be obtained in conventional manner by reacting ethylene oxide and another alkylene oxide, preferably propylene oxide, simultaneously and/or sequentially in any order with an initiator such as water, a polyol, a hydroxylamine, a polyamine and the like having from 2 to 6, preferably 2 to 3, active hydrogen atoms. Preferred initiators are ethylene glycol, diethylene glycol, propylene glycol, dipropylene glycol, glycerol, trimethylol propane, ethanolamine, diethanolamine and triethanolamine.

Alternatively, the polyol composition may comprise a mixture of two or more polyoxyakylene polyols such that the total composition has the required average functionality, equivalent weight and oxyethylene content. The polyoxyakylene polyols present in such mixtures are preferably poly(oxyethylene-oxypropylene) polyols but one or more polyoxyethylene polyols and/or polyoxypropylene polyols may also be present.

Preferred polyol compositions—in as far as polyether polyols having a number average hydroxyl equivalent weight of from 1000 to 3000 are concerned—consist of:

(a) from 50 to 100% by weight of a polyoxyalkylene polyol containing oxyethylene residues, said polyol component having an average nominal hydroxyl functionality of from 2 to 6, preferably 2 to 3, a number average hydroxyl equivalent weight of from 1000 to 3000 and an average oxyethylene content of from 25 to less than 50% by weight, and (b) from 50 to 0% by weight of one or more other polyols having an average nominal functionality of from 2 to 6, preferably 2 to 3, a number average equivalent weight of 1000 to 3000 and an oxyethylene content of less than 25% by weight, preferably 10 to less than 25% by weight or 50% or more, preferably 50–85% by weight; the polyol composition having the hydroxyl functionality, the equivalent weight and the oxyethylene content described before.

The term "average nominal hydroxyl functionality" is used herein to indicate the average functionality (number of hydroxyl groups per molecule) of the polyol composition on the assumption that the average functionality of the polyoxyalkylene polyols present therein is identical with the average functionality (number of active hydrogen atoms per molecule) of the initiator(s) used in their preparation although in practice it will often be somewhat less because of some terminal unsaturation.

If desired, the polyol composition may contain dispersed polymer particles. Such polymer-modified polyols have been fully described in the prior art and include products obtained by the in situ polymerisation of one or more vinyl monomers, for example acrylonitrile and styrene, in polyoxyalkylene polyols or by the in situ reaction between a polyisocyanate and an amino- or hydroxy-functional compound, for example triethanolamine, in a polyoxyalkylene polyol.

The preferred foaming agent for use in the method of the invention is water, optionally in conjunction with a physical blowing agent, for example a low boiling organo fluoro compound. The amount of foaming agent may be varied in known manner in order to achieve the desired foam density, suitable amounts of water being, for example, from 0.25 to 20% by weight, preferably 2–15% by weight, based on the weight of polyol composition. Preferably water is the only foaming agent. The isocyanate index of the reaction system, taking account of the polyol composition, water and any other isocyanate-reactive species, for example chain extenders or cross-linking agents, may be as low as 10 or as high as 120 and preferably is 40 to 110. The free rise density of the flexible foams may range from 15 to 100 kg/m$^3$, preferably from 20 to 80 kg/m$^3$.

The foam-forming reaction mixture may contain one or more of the additives used for making flexible foam. Such additives include catalysts, for example tertiary amines, tin compounds and preferably alkali or earth alkaline metal carboxylates in particular potassium carboxylates, surfaceactive agents and foam stabilisers, for example siloxane-oxyalkylene copolymers, chain extenders, for example low molecular weight diols like glycol, butanediol, diethylene glycol and polyethyleneglycol, having a molecular weight of 200–1000, cross-linking agents, for example glycerol, trimethylolpropane, diethanolamine and triethanolamine, flame retardants, organic and inorganic fillers, pigments, agents for suppressing the so-called boiling-foam effect like polydimethylsiloxanes and internal mould release agents. The chain extenders and/or cross-linkers are preferably used in an amount of 2 parts by weight or less and most preferably 1 part by weight or less per 100 parts by weight of polyether polyols having a number average hydroxyl equivalent weight of 1000 to 3000.

The preferred carboxylate catalysts may be selected from aliphatic carboxylates having 1–10 carbon atoms like acetate, hexanoate, 2-ethylhexanoate and octanoate.

Further the carboxylate may be selected from those having the formula R—E—A—COO$^-$ wherein A is a hydrocarbon diradical having 1–6 preferably 1–3 carbon atoms;

E is —O— or

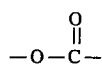

and

R is X—R$_1$—(OR$_2$)$_n$— wherein X is CH$_3$— or OH—, R$_1$ is a hydrocarbon diradical having 1–8 and preferably 1–4 carbon atoms, R$_2$ is a diradical having 2–4 and preferably 2 or 3 carbon atoms and n is 0 to 10, preferably 0–5.

Some of such catalysts and their preparation are known as such, see EP 294161 and EP 220697.

A may be selected from diradicals like —CH$_2$—, —CH$_2$CH$_2$—, —CH$_2$CH$_2$CH$_2$—, —CH=CH—CH$_2$—

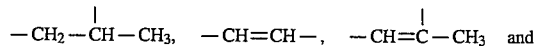

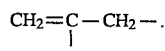

The most preferred diradical is —CH=CH—.

R$_1$ may be selected from those hydrocarbon diradicals mentioned for A and from radicals obtained by removing two hydrogen atoms from e.g. butane, pentane, hexane and octane. The most preferred radicals for R$_1$ are methylene, ethylene, trimethylene, tetramethylene and propylene.

R$_2$ may be selected from ethylene, trimethylene, tetramethylene, ethylethylene and propylene. Most preferred groups are ethylene and propylene.

Examples of catalysts are sodium acetate, potassium acetate, potassium hexanoate, potassium 2-ethylhexanoate, potassium ethoxyacetate, sodium ethoxyacetate, the potassium salt of the hemi-ester of maleic acid and ethoxyethane, ethoxyethoxyethane, ethylene glycol, diethylene glycol, triethylene glycol, tetraethylene glycol, propylene glycol, dipropylene glycol, tripropylene glycol, methanol, ethanol, propanol or butanol and the potassium salt of the hemi-ester of such hydroxy containing compounds with malonic, succinic, glutaric, adipic or fumaric acid.

By using this special class of catalysts instead of conventional tertiary amine-containing catalysts the foams show a reduced chance of discoloration due to side reactions with additives like antioxidants, give less rise to unpleasant smell, are easier recyclable and give less rise to the occurence of fogging.

The amount of carboxylate salt used is in the range of 0.1 to 5, preferably 0.2–3 parts by weight per 100 parts by weight of reactants.

Accordingly, in a further aspect, the invention is concerned with a reaction system comprising:

(i) a polyisocyanate containing at least 85% by weight of 4,4'-diphenylmethane diisocyanate or a liquid variant thereof;

(ii) a polyol composition comprising at least one poly(oxyethylene-oxyalkylene) polyol, the composition having an average nominal hydroxyl functionality of from 2 to 6, a number average hydroxyl equivalent weight of from 1000 to 3000 and an average oxyethylene content of from 25 to less than 50% by weight, (iii) a foaming agent comprising water, and, optionally, (iv) one or more additives used in flexible foam formulations. This reaction system is used for making flexible foams. The term "reaction system" is defined as a system wherein the polyisocyanate is kept in a container separate from the isocyanate-reactive ingredients.

In operating the method of the invention, the known one-shot, semi-prepolymer and full prepolymer techniques may be used together with conventional mixing equipment and the foams may be produced in the form of slabstock, mouldings and the like.

Prepolymers having an NCO value of 5–30% by weight which are the reaction product of the above polyisocyanates (in excess) and polyols also form part of the invention. The preparation of prepolymers as such is generally known in the art.

Foams made by the method of the invention have valuable energy-absorbing properties making them useful for acoustic vibration damping as well as for seating purposes. The foams show a lower Tg than foams prepared from polyols having a higher oxyethylene content; the foams according to the invention show a low density with an improved resilience while retaining most of the good properties of such foams prepared from polyols having a higher oxyethylene content, like tear strength, elongation at break and compression set.

Further the foams according to the invention have open cells or easily crushable cells.

The invention is illustrated but not limited by the following Examples in which all parts, percentages and ratios are by weight.

The following glossary of materials is included to identify reaction components not otherwise identified in the Examples.

GLOSSARY

Polyol 1: an EO/PO polyol having a nominal functionality of 3, an OH value of 38.5 mg KOH/g, an EO content of 59% by weight and an EO-tip content of 19% by weight.

Polyol 2: an EO/PO polyol having a nominal functionality of 3, an OH value of 36 mg KOH/g, an EO content of 39% by weight and an EO-tip content of 10% by weight.

Polyol 3: an EO/PO polyol having a nominal functionality of 3, an OH value of 26 mg KOH/g, an EO content of 29% by weight and an EO-tip content of 15% by weight.

Dabco EG is a 33% solution of Dabco in ethylene glycol, obtainable from Air Products. Dabco is a trade mark of Air Products.

Polyisocyanate: an MDI comprising 1.8% by weight of 2,2'+2,4'-MDI, 84.6% by weight of 4,4'-MDI and 13.6% by weight of uretonimine modified 4,4'-MDI and having an NCO content of 31.4% by weight.

DBDTL is dibutyltin dilaurate.

A1 is Niax A1: a catalyst obtainable from Union Carbide. Nias ix a trademark of Union Carbide.

DELA: diethanolamine.

Dabco EG: a catalyst from Air Products.

The polyisocyanate was reacted in a foam-cup at a certain index, indicated in Table 1, with an isocyanate-reactive composition details of which are also given in Table 1 together with some physical properties. All amounts are in parts by weight.

TABLE 1

| Index | 100 | 97 | 96 | 102 |
|---|---|---|---|---|
| Polyol 1 | 50 | 20 | — | — |
| Polyol 2 | 50 | 80 | 100 | — |
| Polyol 3 | — | — | — | 100 |
| Water | 3 | 3 | 3 | 3 |
| Dabco EG | 0.4 | 0.4 | 0.4 | 0.4 |
| DBTDL | 0.1 | 0.15 | 0.15 | 0.15 |
| Niax A1 | 0.15 | 0.15 | 0.15 | 0.15 |
| DELA | — | 0.7 | 0.9 | 1 |
| Free rise density, Kg/m$^3$ | 38 | 39 | 41 | 36 |
| Resilience, % (Iso 8307) | 48 | 36 | 39 | 44 |
| Glass transition temperature, °C. (Dynamic Mechanical Thermal Analysis, DMT Analyser MKII of Polymer Laboratories Ltd) | −24 | — | −25 | −42 |

We claim:

1. A method for the preparation of flexible polyurethane foams by reacting a polyisocyanate containing at least 85% by weight of 4,4'-diphenylmethane diisocyanate or a liquid variant thereof with a polyol composition comprising at least one poly(oxyethylene-oxyalkylene) polyol, the composition having an average nominal hydroxyl functionality of from 2.5 to 6, a number average hydroxyl equivalent weight of from 1000 to 3000 and an average oxyethylene content of from 40 to less than 50% by weight and with water.

2. A method according to claim 1 wherein the poly(oxyethylene-oxyalkylene) polyol is a poly(oxyethylene-oxypropylene) polyol.

3. A method according to claim 1 wherein the polyol composition has an average nominal hydroxyl functionality of from 2.5 to 3.

4. A method according to claim 1 wherein the polyisocyanate contains at least 90% by weight of 4,4'-diphenylmethane diisocyanate or a liquid variant thereof.

5. A method according to claim 1 wherein the polyisocyanate contains at least 95% by weight of 4,4'-diphenylmethane diisocyanate or a liquid variant thereof.

6. A method according to claim 1 wherein the polyol composition comprises (a) from 50 to 100% by weight of a polyoxyalkylene polyol containing oxyethylene residues, said polyol component having an average nominal hydroxyl functionality of from 2 to 6, a number average hydroxyl equivalent weight of from 1000 to 3000 and an average oxyethylene content of from 25 to less than 50% by weight, and (b) from 50 to 0% by weight of one or more other polyols having an average nominal functionality of from 2 to 6, preferably 2 to 3, a number average equivalent weight of 1000 to 3000 and an oxyethylene content of less than 25% by weight, or 50% or more.

7. A method according to claim 1 wherein a catalytic effective amount of a salt of an alkali metal or earth alkaline metal and a carboxylic acid is employed.

8. A method according to claim 1 wherein water is the only blowing agent.

9. A reaction system comprising:

(i) a polyisocyanate containing at least 85% by weight of 4,4'-diphenylmethane diisocyanate or a liquid variant thereof;

(ii) a polyol composition comprising at least one poly(oxyethylene-oxyalkylene) polyol, the composition having an average nominal hydroxyl functionality of from 2.5 to 6, a number average hydroxyl equivalent weight of from 1000 to 3000 and an average oxyethylene content of from 25 to less than 50% by weight;

(iii) a foaming agent comprising water, and, optionally, (iv) one or more additives used for making flexible foams.

10. A prepolymer having an NCO value of 5–30% by weight which is the reaction product obtained by reacting an excessive amount of a polyisocyanate containing at least 85% by weight of 4,4'-diphenylmethane diisocyanate or a liquid variant thereof with a polyol composition comprising at least one poly(oxyethylene-oxyalkylene) polyol, the composition having an average nominal hydroxyl functionality of from 2.5 to 6, a number average hydroxyl equivalent weight of from 1000 to 3000, and an average oxyethylene content of from 25 to less than 50% by weight.

* * * * *